US008482752B2

(12) United States Patent
Tsukada

(10) Patent No.: US 8,482,752 B2
(45) Date of Patent: Jul. 9, 2013

(54) IMAGE PROCESSING DEVICE FOR PRINTING A PLURALITY OF MANUSCRIPT DATA SETS IN PRESCRIBED ORDER BASED ON COMPOSITION GUIDELINE DATA

(75) Inventor: Koji Tsukada, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 487 days.

(21) Appl. No.: 12/728,652

(22) Filed: Mar. 22, 2010

(65) Prior Publication Data

US 2010/0238482 A1     Sep. 23, 2010

(30) Foreign Application Priority Data

Mar. 23, 2009  (JP) ................................. 2009-069288

(51) Int. Cl.
G06K 15/02  (2006.01)
(52) U.S. Cl.
USPC ........................................ 358/1.14; 358/1.15
(58) Field of Classification Search
USPC ............................................... 358/1.14, 1.15
See application file for complete search history.

(56) References Cited

U.S. PATENT DOCUMENTS

| 7,933,870 | B1 * | 4/2011 | Webster .................... 707/638 |
| 2002/0016846 | A1 * | 2/2002 | Ono .................... 709/229 |
| 2004/0199809 | A1 * | 10/2004 | Hanam et al. .................... 714/4 |
| 2005/0225790 | A1 * | 10/2005 | Hayasaki .................... 358/1.13 |
| 2006/0050310 | A1 * | 3/2006 | Ito .................... 358/1.15 |
| 2008/0082575 | A1 * | 4/2008 | Peter et al. .................... 707/103 Z |
| 2008/0216060 | A1 * | 9/2008 | Vargas .................... 717/137 |
| 2008/0252934 | A1 | 10/2008 | Arita et al. |

FOREIGN PATENT DOCUMENTS

| JP | 10-016343 A | 1/1998 |
| JP | 11-212741 A | 8/1999 |
| JP | 2005-085120 | 3/2005 |
| JP | 2006-344132 | 12/2006 |
| JP | 2008-009569 | 1/2008 |
| JP | 2008-102721 | 5/2008 |

OTHER PUBLICATIONS

Machine translation for JP 2006-344132, IDS.*
Office Action (Notice of Grounds of Rejection) dated Feb. 8, 2011, issued in the corresponding Japanese Patent Application No. 2009-069288, and an English Translation thereof.
Office Action (Notice of Grounds of Rejection) dated Jun. 28, 2011, issued in the corresponding Japanese Patent Application No. 2009-069288, and an English Translation thereof.

* cited by examiner

Primary Examiner — Qian Yang
(74) Attorney, Agent, or Firm — Buchanan Ingersoll & Rooney PC

(57) ABSTRACT

An image processing device acquires composition guideline data containing information specifying a plurality of manuscript data sets and the printing order of the data sets. The image processing device accesses an external device based on composition guideline data to acquire at least one of the manuscript data sets from that external device via communication. A print instruction is issued such that the plurality of manuscript data sets specified by composition guideline data, including the acquired manuscript data set, are printed in the order indicated by composition guideline data. Thus, a plurality of manuscript data sets may be easily printed in a prescribed order based on composition guideline data.

16 Claims, 10 Drawing Sheets

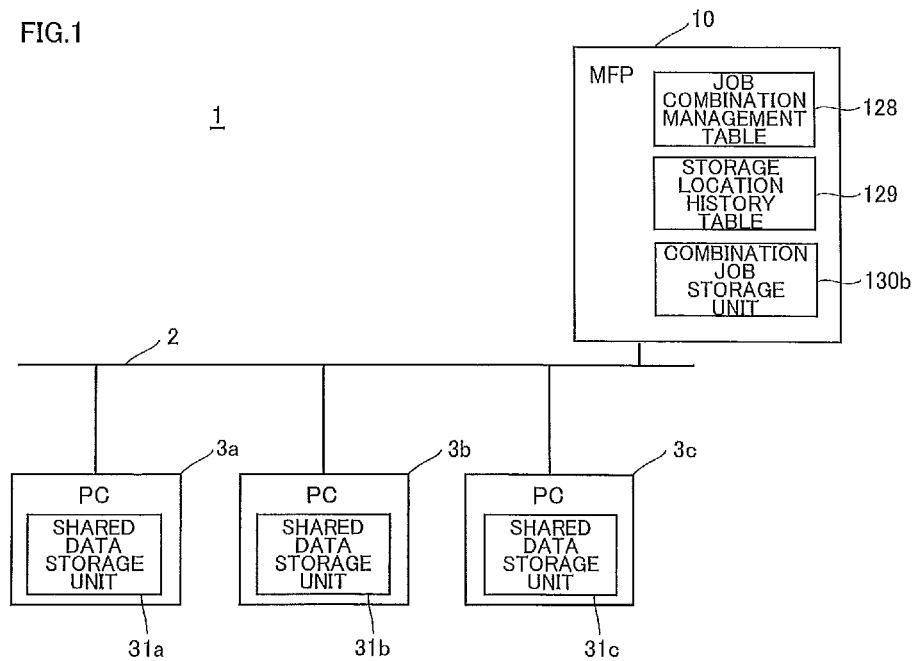
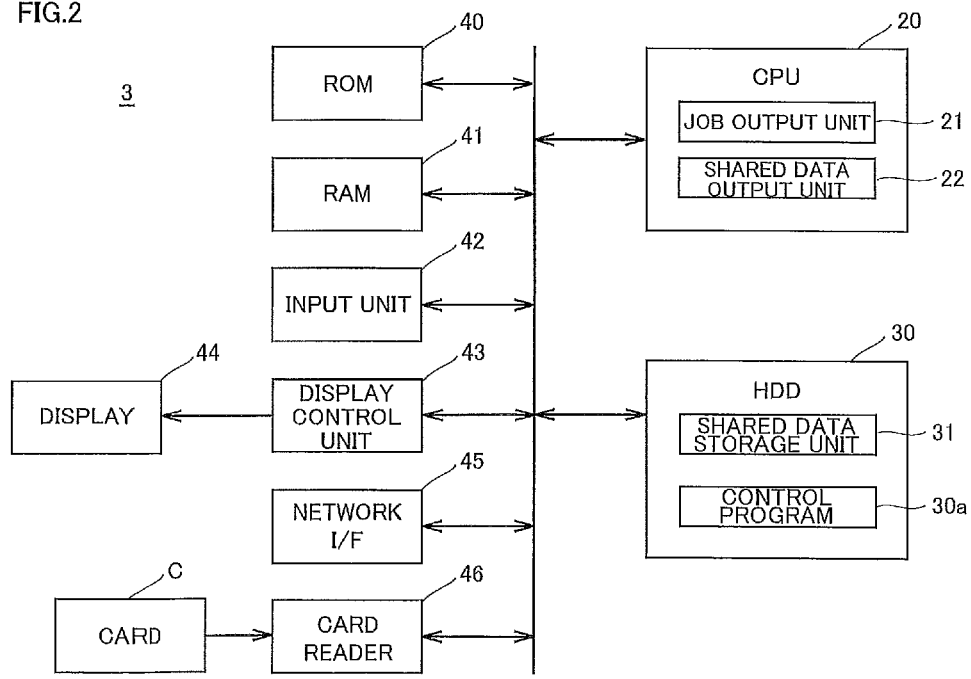

| NUMBER | STORAGE LOCATION | USER ID | PASSWORD |
|--------|------------------|--------------|--------------|
| 1 | \\PC3B\SHARED BOX\ | REQUIRED | REQUIRED |
| 2 | \\PC3C\SHARED\ | NOT REQUIRED | NOT REQUIRED |
| . | . | . | . |
| . | . | . | . |

FIG.7

| ORDER | MANUSCRIPT NAME | STORAGE LOCATION | USER ID | PASSWORD | DELETE |
|---|---|---|---|---|---|
| 1 | EDUCATION 1 | NONE | NONE | NONE | NOT REQUIRED |
| 2 | EDUCATION 2 | NONE | NONE | NONE | NOT REQUIRED |
| 3 | COMPARISON MATERIALS | \\PC3B\SHARED BOX\ | GUEST | KONICA | NOT REQUIRED |
| 4 | ATTACHED MATERIALS | \\PC3C\SHARED\ | NONE | NONE | REQUIRED |

| ORDER | MANUSCRIPT (JOB) NAME | STORAGE LOCATION | USER ID | PASSWORD | DELETE | WAIT | ACQUIRE |
|---|---|---|---|---|---|---|---|
| 1 | EDUCATION 1 | NONE | NONE | NONE | NOT REQUIRED | NO | ALREADY |
| 2 | EDUCATION 2 | NONE | NONE | NONE | NOT REQUIRED | NO | ALREADY |
| 3 | COMPARISON MATERIALS | \\PC3B\SHARED BOX\ | GUEST | KONICA | NOT REQUIRED | YES | NOT YET |
| 4 | ATTACHED MATERIALS | \\PC3C\SHARED\ | NONE | NONE | REQUIRED | YES | NOT YET |

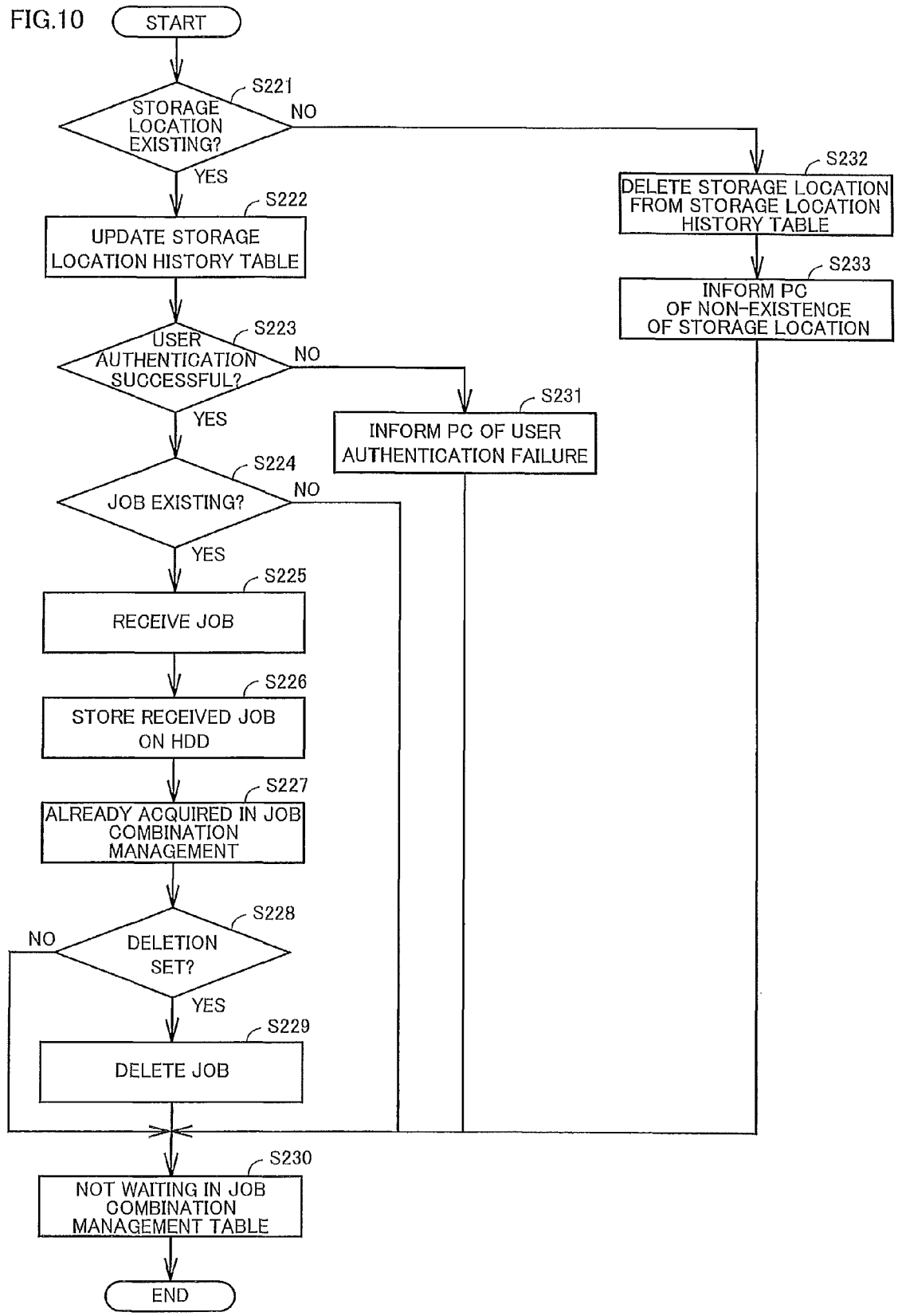

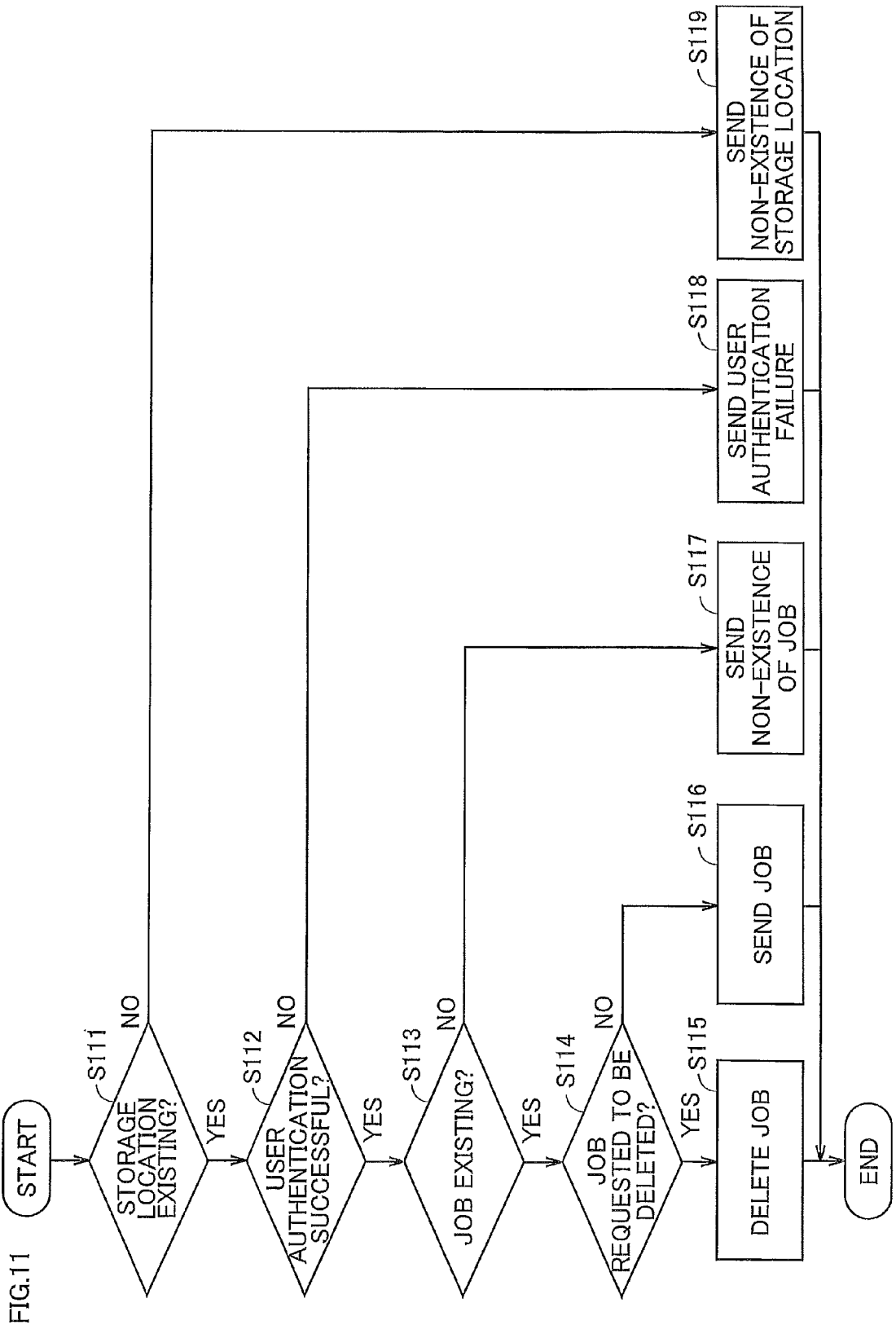

IMAGE PROCESSING DEVICE FOR PRINTING A PLURALITY OF MANUSCRIPT DATA SETS IN PRESCRIBED ORDER BASED ON COMPOSITION GUIDELINE DATA

This application is based on Japanese Patent Application No. 2009-69288 filed with the Japan Patent Office on Mar. 23, 2009, the entire content of which is hereby incorporated by reference.

BACKGROUND OF THE INVENTION

1. Field of the Invention

The present invention relates to an image processing device, and more particularly, an image processing device for printing a plurality of manuscript data sets in a prescribed order based on composition guideline data.

2. Description of the Related Art

In the fields of book printing and quick printing, a new catalog or manual may generally be made in the following procedure to maximize efficiency: First, the entire composition of the catalog or manual is determined; next, each chapter is assigned to one of the creators; then, all the creators get started on the project.

In view of such a procedure, Document 1, specified below, discloses a system in which a plurality of client personal computers (PCs) are connected with a printing device through a network. The printing device first receives a job combination list and, when all the registered manuscripts become available, puts the registered manuscripts together into one print job before printing it. In this procedure, a list that indicates the manuscripts to be combined as well as their order (job combination list) is sent to the printing device after the entire composition of the documents to be created is determined. Each creator then sends his or her finished manuscript to the printing device. When all the manuscripts on the list are available, the printing device automatically combines the manuscripts according to the list before actually printing them.

Document 1 describes a process in which an output time for a print job is set, and replacement of a manuscript is allowed until that output time. If not all the registered manuscripts become available by that time, the available manuscripts are put together and printed as long as the manuscripts that are absolutely necessary are available. A blank page is inserted to remove any irregularities for a center spread.

Document 2, specified below, discloses a system in which a plurality of client PCs are connected with a printing device through a network. Before a client PC sends a job, it attaches to the job the name of the group in which the job is to be combined and information indicating its location within it. After all the registered manuscripts become available, they are put together into one print job before being printed.

During this process, each creator attaches, to his/her manuscript, the name of the group in which the manuscript is to be combined, as well as information indicating its place in the order i.e. its location within that group, and then sends them all to the printing device. The composition of the documents to be created can be flexibly modified even after the entire composition is determined.

Recent developments for image forming devices have made it possible to incorporate functions specific to quick printing devices into image forming devices.

Image forming devices include multi-function peripherals (MFPs) which includes scanning functions, facsimile functions, copying functions, printing functions, data communication functions, and server functions, as well as facsimile devices, copiers and printers. An image forming device forms an electrostatic latent image using exposure of a charged photo conductor. The latent image is developed with a toner. The toner image is transferred to a sheet. The toner image is heat-fixed by a fixing device. Some image forming devices form an image on a sheet using an ink-jet method.

[Document 1] JP 10-16343 A
[Document 2] JP 11-212741 A

Instead of several people making a catalog or manual, someone at a normal office may want to combine several manuscripts and print them. For example, a manuscript creator may want to insert (or add) a drawing or data that someone else ("manuscript provider") has created into (or to) his/her own manuscript, and print them as one print. The manuscript creator knows the entire composition of the print as well as which image forming device should output it. The manuscript provider may not do the same line of work as the manuscript creator. Usually, therefore, the manuscript provider knows the manuscript to be provided but doesn't know much about anything else.

According to the conventional art, the manuscript creator needs to send to the image forming device a list that specifies the manuscripts to be combined and their order after the entire composition of the print is determined. Then, the manuscript creator needs to communicate with the manuscript provider and ask him/her to send a needed manuscript to the image forming device. In this way, according to the conventional art, the manuscript creator needs to maintain a close contact with the manuscript provider to combine manuscripts into one print before printing it.

SUMMARY OF THE INVENTION

The present invention was made to solve this problem. An object of the present invention is to provide an image processing device that is capable of printing, in a simple way, a plurality of manuscript data sets in a prescribed order based on composition guideline data.

To achieve this object, according to an embodiment of the present invention, an image processing device includes: a first acquiring unit for acquiring composition guideline data containing information specifying a plurality of manuscript data sets and an output order of the plurality of manuscript data sets; a second acquiring unit for accessing a first external device based on the composition guideline data to acquire at least one of the plurality of manuscript data sets from the first external device via communication; and an output instruction unit for issuing an output instruction for outputting the plurality of manuscript data sets specified by the composition guideline data, including the manuscript data set acquired by the second acquiring unit, in an order indicated by the composition guideline data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram that shows an entire configuration of a job combination system according to an embodiment of the present invention.

FIG. 2 is a block diagram that shows an internal configuration of PC 3.

FIG. 6 shows contents of storage location history table 129.

FIG. 7 shows contents of composition guideline data 50.

FIG. 9 shows contents of job combination management table 128.

FIG. 10 is a flow chart that illustrates a subroutine of the job acquisition process executed at step S209 of FIG. 8.

FIG. 11 is a flow chart that illustrates a process of outputting a shared data set (i.e. a job) to MFP 10 executed by PCs 3b and 3c.

DESCRIPTION OF THE PREFERRED EMBODIMENTS

Figure 3:
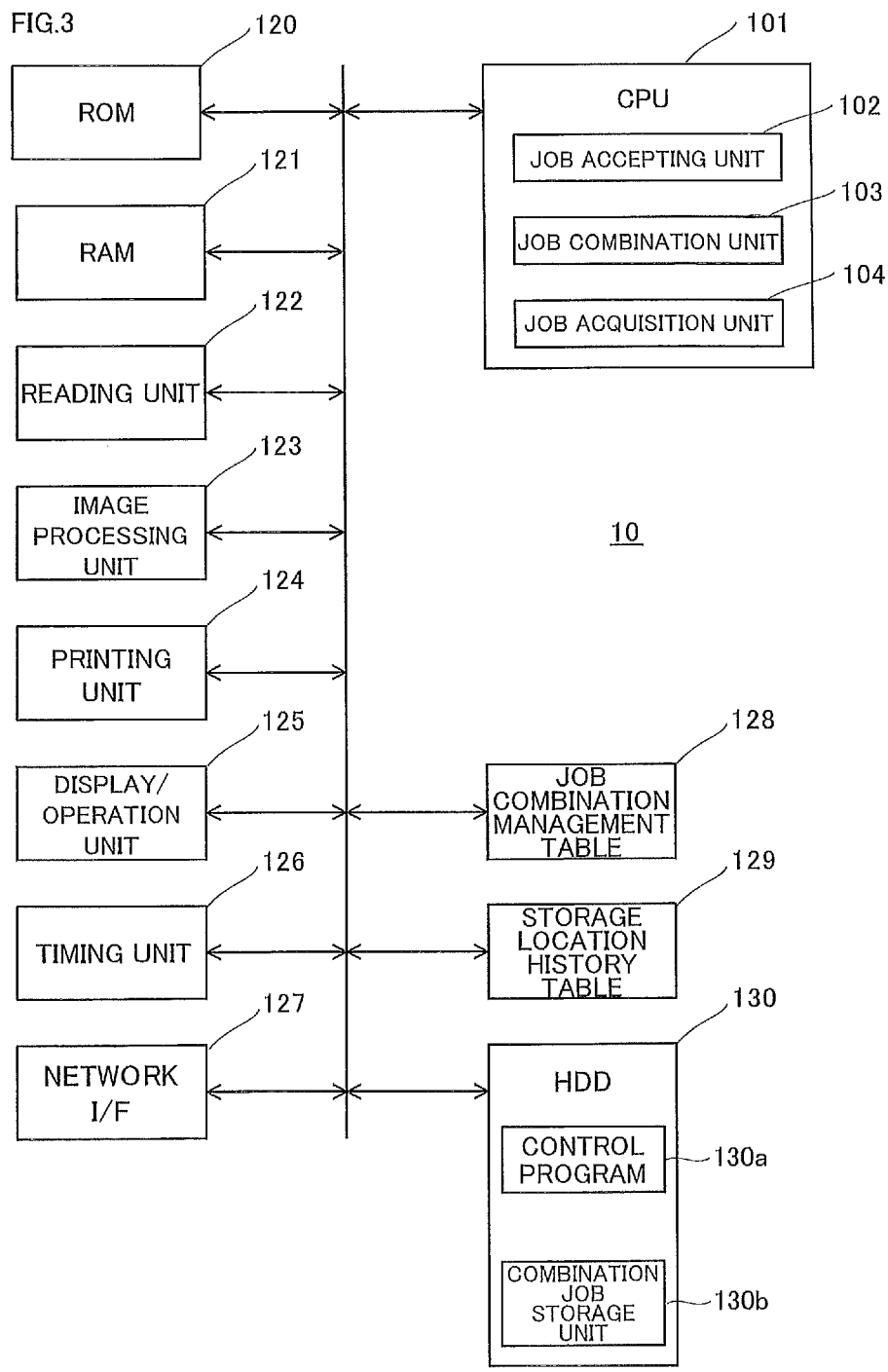
FIG. 3 is a block diagram that shows an internal configuration of MFP 10.

A job combination system according to an embodiment of the present invention will be described below.

In the job combination system, a client machine (i.e. a PC) and an image forming device (i.e. a multi-function peripheral (MFP) in this example), both connected to a network, work together and communicate manuscript data. The image forming device combines a plurality of manuscript data sets into one print data set before printing it. Such printing is also referred to as "combined job printing", since print jobs based on a plurality of manuscript data sets are combined.

A plurality of manuscript data sets to be combined are stored on a PC or MFP beforehand. Specifically, a storage unit (i.e. a box) for storing manuscript data sets that should be combined is provided in each of a plurality of PCs and an MFP. Before combined job printing, the MFP acquires needed manuscript data sets from the storage unit of a PC based on a previously obtained list (i.e. composition guideline data), and combines the manuscript data sets accordingly. The list contains information that specifies manuscript data sets to be combined and their combination order, as well as where the manuscript data sets are stored.

The ability of an MFP to automatically acquire and combine manuscript data sets will make it easier for a manuscript creator and a manuscript provider to work together.

(1) Configuration of Job Combination System

FIG. 1 is a diagram that shows an entire configuration of a job combination system according to an embodiment of the present invention.

As shown, job combination system 1 includes PCs 3a, 3b and 3c connected to a network 2, and an MFP 10. PCs 3a, 3b and 3c have similar hardware configurations. The term "PC 3" will be used to denote any one of them.

Network 2 is a wired or wireless local area network (LAN). Connection via network 2 is established using the Transmission Control Protocol/Internet Protocol (TCP/IP). Devices connected to network 2 can communicate various data with each other. Network 2 may be replaced by a wide area network such as the Internet or a private line to connect the devices.

PC 3 is a personal computer that includes: a PC body (an example of a computer) including a CPU, a RAM, a ROM, an EEPROM and a hard disc drive (HDD); a monitor; and an input device such as a keyboard and a mouse. PC 3 includes, on its storage device, application software for creating documents, drawings and the like. PC 3 instructs MFP 10 to print created documents and the like.

MFP 10 includes: a reading unit for reading a manuscript set in place; a printing unit for forming an image on a recording medium, such as paper, based on image data; and a hard disc drive (HDD) for storing document data. MFP 10 features image reading (scanning), facsimile functions, copying, data communication, server functions, and image printing.

PCs 3a, 3b and 3c provide shared data storage units 31a, 31b and 31c, respectively, on their respective hard disc drive(s), RAM(s), or EEPROM(s). Shared data storage units 31a, 31b and 31c store manuscript data sets that should be combined (i.e. are "boxes"). They are referred to as "shared data storage units" because they store manuscript data shared by a plurality of users.

Shared data storage units 31a, 31b and 31c are capable of storing manuscript data in a format that allows it to be edited by a word processing application program or a spreadsheet application program, such as manuscript data with a file extension like ".doc" or ".xls." To be able to handle such a file, the MFP must hold an application program that enables the opening of such manuscript data (or must be in an environment that allows it to access such an application program).

In order to allow the MFP to print manuscript data without using such an application program, it is desirable that shared data storage units 31a, 31b and 31c hold manuscript data in a format that allows the MFP to print it without help, such as print data in a page description language (printer language) or bitmap data into which data that can be edited by an application program has been converted.

Thus, manuscript data may be manuscript data in a format that allows it to be edited by an application program, or converted print data in a page description language (printer language), or bitmap data. Alternatively, it may be versatile data such as Portable Document Format (PDF) data that can be printed by the MFP. One manuscript data set is also referred to as a job, since it is a work unit for printing.

MFP 10 has a job combination management table 128, a storage location history table 129 and a combination job storage unit 130b on its hard disc drive, RAM or EEPROM. Job combination management table 128 is a table for managing the acquisition of a missing job needed for a combined job printing process that has been accepted.

Storage location history table 129 is a table for storing a valid storage location for manuscript data based on a previously made access to that data.

Combination job storage unit 130b is a storage unit for temporarily storing a job that should be combined with another one.

In the following description, MFP 10 is an example of an image processing device or image forming device; PCs 3b and 3c are examples of a first external device that sends, to MFP 10, manuscript data on shared data storage unit 31b or 31c in response to an access by MFP 10; and PC 3a is an example of a second external device that sends, to MFP 10, composition guideline data that contains information specifying a plurality of manuscript data sets and the printing order of the manuscript data sets to instruct MFP 10 to perform combined job printing.

(2) Configuration of PC 3

FIG. 2 is a block diagram that shows an internal configuration of PC 3.

As shown, PC 3 includes a CPU 20, a ROM 40, a RAM 41, an input unit 42, a display control unit 43, a display 44, a network I/F 45, a card reader 46, and a hard disc drive (HDD) 30.

CPU 20 controls the entire equipment. ROM 40 stores a basic input/output system (BIOS) and a boot program. RAM 41 is a volatile memory that serves as a work area while CPU 20 is executing a program. HDD 30 stores an operating system, one or more applications, one or more drivers, various programs, and data files.

Network interface (I/F) 45 communicates with an external device via LAN 2 using a communication protocol, such as TCP/IP.

Input unit 42 is an input device such as a keyboard and a mouse. Display control unit 43 generates an image at a video memory under control of CPU 20 and outputs image data stored on the video memory as a video signal. Display 44 is a display device such as a CRT and a liquid display device.

A user inserts, into card reader 46, a dedicated card C on which an ID number and a password have been stored. Card reader 46 obtains the ID number and the password. The dedicated card may be a magnetic card, an IC card (either contact-type or contactless; a cell phone or a memory device may also be used instead of a card), or the like.

If a contactless card is used as the dedicated card, the user positions, close to the reading unit of card reader 46, dedicated card C on which an ID number and a password have been stored. Card reader 46 obtains the ID number and the password wirelessly.

CPU 20 includes a job output unit 21 and a shared data output unit 22. Job output unit 21 sends, to MFP 10, composition guideline data 50 containing a guideline for combining jobs (FIG. 7) as well as manuscript data.

In response to a request from MFP 10, shared data output unit 22 performs user authentication and then reads manuscript data from a directory in shared data storage unit 31 and send it to MFP 10. In addition, shared data output unit 22 may delete manuscript data in response to a request from MFP 10.

HDD 30 includes a shared data storage unit 31. Shared data storage unit 31 is provided as a directory on a standard file system of the operating system. Access to the directory may be restricted to a holder of a user ID and a password. Alternatively, access may be unrestricted.

When PC 3 is powered on, CPU 20 loads an operating system from HDD 30 onto RAM 41 according to a boot program on ROM 40. The PC also loads various device drivers onto the RAM. Further, CPU 20 loads a control program 30a onto RAM 41 and executes it.

(3) Configuration of MFP 10

FIG. 3 is a block diagram that shows an internal configuration of MFP 10.

As shown, MFP 10 includes a CPU 101 (an example of a computer), a ROM 120, a RAM 121, a reading unit 122, an image manipulation unit 123, a printing unit 124, a display/operation unit 125, a timing unit 126, a network I/F 127, a job combination management table 128, a storage location history table 129, and an HDD 130.

CPU 101 reads a needed program from ROM 120. CPU 101 controls the timing of operations of the various units in a synchronized manner throughout the equipment. CPU 101 performs various operations, such as scan jobs, copy jobs, print jobs, and job combination.

ROM 120 stores various programs and various fixed data used for processing a job.

RAM 121 is a volatile memory. RAM 121 serves as work memory while CPU 101 is executing a program, or as page memory storing at least one page of image data to assist in rotating the image, for example.

Reading unit 122 includes: a light source that illuminates a manuscript; a line image sensor that reads one line of a manuscript along the width direction of the manuscript; a shift mechanism that shifts the line-based reading position along the length direction of the manuscript; and an optical route including a lens and a mirror for directing light reflected from the manuscript to the line image sensor to produce an image. Reading unit 122 reads a manuscript to obtain corresponding image data.

The line image sensor is composed of charge-coupled devices (CCDs). An analog image signal from the line image sensor is A/D converted to a digital image signal, which is obtained by the equipment.

Image manipulation unit 123 scales up or down an image, rotates an image and compresses or decompresses image data.

Printing unit 124 includes a transport device for a recording sheet, a photoreceptor drum, a charging device, a laser unit, a development device, a transfer/separation device, a cleaning device, and a fixing device. Printing unit 124 uses an electrophotographic process to form an image corresponding to image data as an output on a recording sheet. Printing unit 124 may use other imaging methods than electrophotographic processes.

Display/operation unit 125 includes a liquid display having a touch panel on its surface, and various control switches. Display/operation unit 125 displays to the user various kinds of guidance, various conditions, or error notifications. In addition, it receives various operations by the user.

Timing unit 126 holds a current date and time. Timing unit 126 keeps such data with help of its own backup power supply even when MFP 10 is powered off.

Network I/F 127 communicates data with an external device via LAN 2 using a communication protocol such as TCP/IP in response to an instruction from CPU 101.

HDD 130 stores image data, print data and the like.

CPU 101 includes a job accepting unit 102 for accepting a job, a job combination unit 103 for combining jobs, and a job acquisition unit 104 for acquiring a job.

Job accepting unit 102 accepts composition guideline data 50 (FIG. 7) and a job from PC 3. Job accepting unit 102 stores the job on HDD 130. Job accepting unit 102 rewrites job combination management table 128 based on composition guideline data 50.

Job combination unit 103 combines jobs stored on HDD 130 into one job based on information in job combination management table 128.

Job acquisition unit 104 acquires a job from PC 3 based on information in job combination management table 128, and stores it on HDD 130.

On HDD 130 are provided a program, 130a, for controlling the MFP and an area, 130b, for storing jobs to be combined (combination job storage unit).

(4) Process of Storing a Job Performed by PC 3 (Shared Data Output Process)

Figure 4:
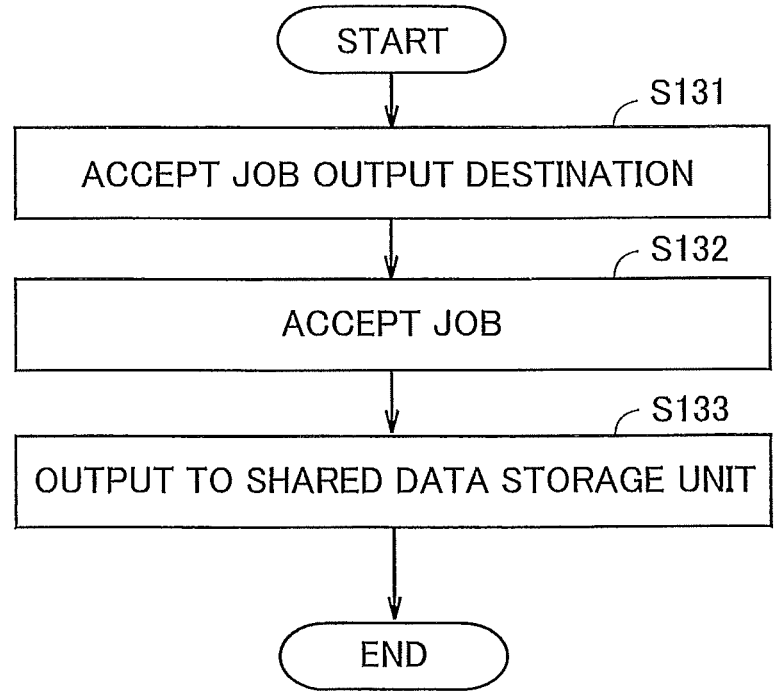
FIG. 4 is a flow chart that illustrates a process of outputting shared data at PC 3.

FIG. 4 is a flow chart that illustrates a process of outputting shared data at PC 3.

More specifically, PC 3 represents PCs 3b and 3c that send, to MFP 10, manuscript data on shared data storage units 31b and 31c in response to an access from MFP 10.

As shown, CPU 20 of PC 3 accepts, as an output destination, a designation of a directory in shared data storage unit 31 via input unit 42 from a user (step S131).

At step S132, CPU 20 accepts a designation of a manuscript data set via input unit 42 from the user.

At step S133, CPU 20 converts the designated manuscript data set into print data. CPU 20 outputs the print data to the designated directory in shared data storage unit 31. It is understood that the CPU may outputs unconverted manuscript data to the designated directory.

If an execution of a job has generated print data, CPU 20 may automatically store it on shared data storage unit 31.

(5) Instruction by PC 3 for Combined Job Printing

Figure 5:
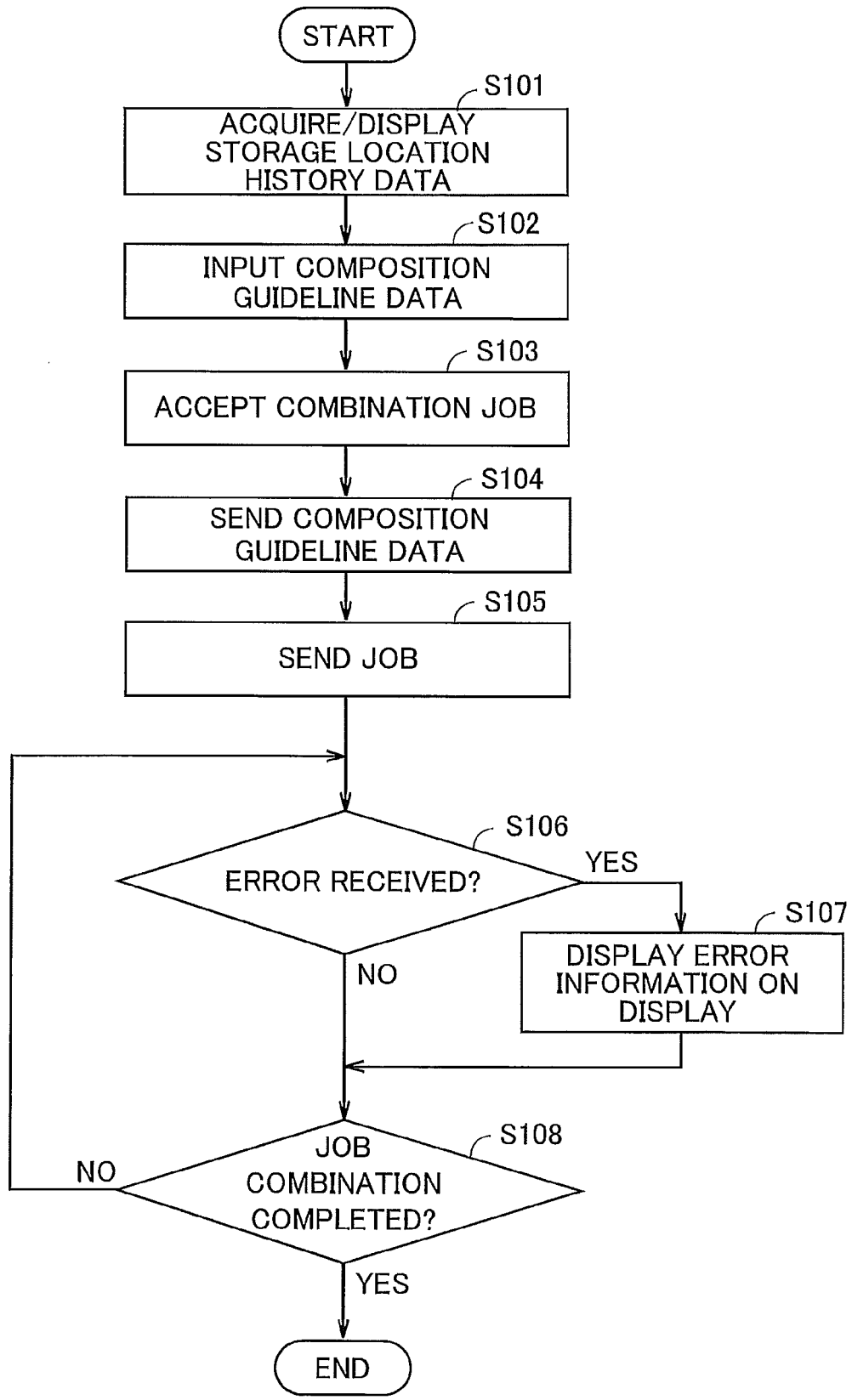
FIG. 5 is a flow chart that illustrates a main routine of control operations executed by PC 3.

FIG. 5 is a flow chart that illustrates a main routine of control operations executed by PC 3.

PC 3 here represents PC 3a that sends, to MFP 10, information specifying a plurality of manuscript data sets and composition guideline data containing the printing order of the manuscript data sets to instruct MFP 10 to perform combined job printing.

As shown, for assistance in inputting composition guideline data 50 (FIG. 7), CPU 20 of PC 3 acquires a storage location history table (i.e. storage location history data) 129 from MFP 10 and displays it on display 44 (step S101).

FIG. 6 shows contents of storage location history table 129.

Storage location history table 129 stores information for specifying a location in shared data storage unit 31 in a PC. Storage location history table 129 is a table that stores a valid storage location for a manuscript data set based on a previous access.

As shown, storage location history table 129 provides columns that store a number, a storage location, a user ID, and a password.

The number column indicates a serial number. Upon accepting a new storage location, storage location history table 129 assigns a new serial number thereto and adds it to the table at the bottom. A record with a storage location that does not exist is deleted. When a record is deleted, the following record(s) is/are moved up.

The storage location column indicates the name of a PC 3 on the network combined with a directory name for specifying a location in shared data storage unit 31 of the PC.

In the user ID column, "required" will be written if access to the directory is restricted, and "not required" if there is no restriction. The same applies to the password column; specifically, "required" will be written in if access to the directory requires a password, and "not required" if access to the directory requires no password.

No user ID or no password is written in storage location history table 129 so that a user ID or a password will not be displayed to a large number of people.

A look at displayed storage location history table 129 will enable a user to learn the location of shared data storage unit 31 at a PC, as well as whether a user ID or a password is required for access.

Returning to FIG. 5, at step S102, a user inputs composition guideline data 50 through input unit 42 of the PC. CPU 20 accepts the input. In addition, the user may input a user ID and a password through card reader 46 (or input unit 42). In this case, CPU 20 inputs the user ID and the password as user authentication information.

FIG. 7 shows contents of composition guideline data 50.

As shown, composition guideline data 50 is data for specifying, for each manuscript data set, a place in a job combination order, a manuscript name, a storage location, a user ID and a password for the storage location, and whether the manuscript data set must be deleted or not after being read out to provide for creating a combined job.

A storage location includes the name of a PC 3 (the present embodiment is described supposing the presence of a DNS server) and a directory name. For a manuscript data set that is sent from the PC along with the composition guideline data, the storage location will be described as "none."

If a user ID and a password are required for the storage location, they will be entered. If not, "none" will be entered.

As shown in FIG. 7, the present embodiment has a print data set for "comparison materials" in the "shared box" directory at PC 3b, and a print data set for "attached materials" in the "shared" directory at PC 3c; further, PC 3a has instructed MFP 10 to perform combined job printing, where the manuscript data sets for "education 1" and "education 2" are to be sent from PC 3a to MFP 10.

Returning to FIG. 5, at step S103, CPU 20 accepts a job (i.e. a manuscript data set) to be sent to MFP 10 along with composition guideline data 50, if there is any. In the example of FIG. 7, it is represented by the manuscript data sets "education 1" and "education 2."

At step S104, CPU 20 sends composition guideline data 50 to MFP 10. If there is a job to be sent along therewith, it is also sent (step S105).

At step S106, CPU 20 determines whether it has received error information such as "STORAGE LOCATION NOT EXISTING" or USER AUTHENTICATION FAILED" from MFP 10. If not (NO at step S106), CPU 20 determines whether it has received the message "JOB COMBINATION COMPLETED" from MFP 10 (step S108).

If it has received the message "JOB COMBINATION COMPLETED" (YES at step S108), the process is ended. If not (NO at step S108), CPU 20 once more determines whether it has received error information such as "STORAGE LOCATION NOT EXISTING" or "USER AUTHENTICATION FAILED" from MFP 10 (step S106).

If, at step S106, CPU 20 has received error information (YES at step S106), CPU 20 displays the error information on display 44 (step S107) and then proceeds to step S108. CPU 20 determines whether it has received JOB COMBINATION COMPLETED from MFP 10 (step S108).

(6) Job Combination Process by MFP

Figure 8:
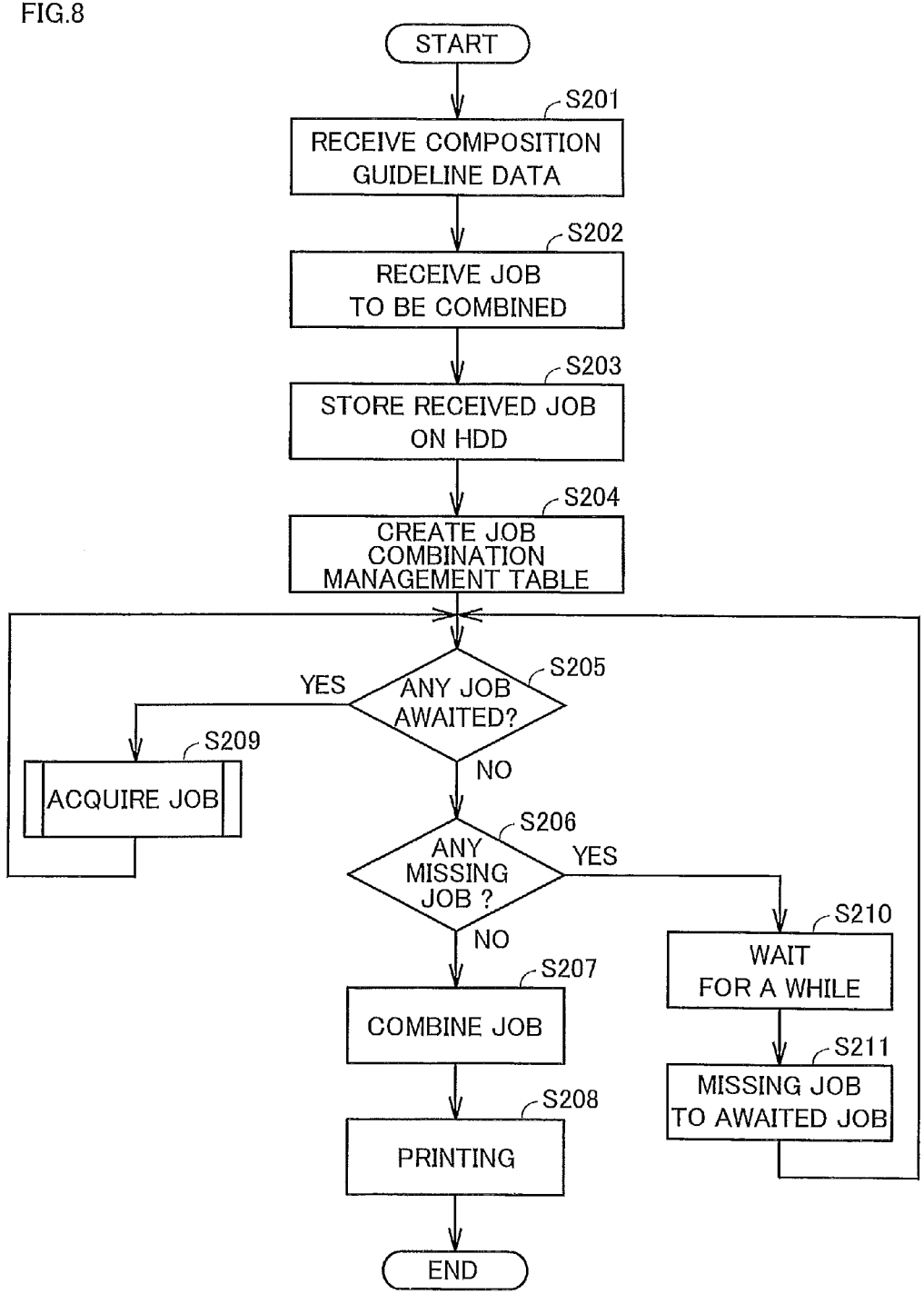
FIG. 8 is a flow chart that illustrates a main routine of control operations by MFP 10.

FIG. 8 is a flow chart that illustrates a main routine of control operations by MFP 10.

As shown, CPU 101 at MFP 10 receives composition guideline data 50 from PC 3a (step S201). CPU 101 of MFP 10 stores it on HDD 130 or RAM 121. Composition guideline data 50 was sent from PC 3a at step S104 of FIG. 5.

At step S202, CPU 101 at MFP 10 receives from PC 3a a job that will be part of a combined job, and stores it on HDD 130 (step S203).

At step S204, CPU 101 at MFP 10 transfers contents of composition guideline data 50 to columns in job combination management table 128, i.e. manuscript name, storage location, user ID, password and whether deletion is necessary.

Job combination management table 128 is a table for managing acquisition of a missing job needed for the accepted combined job printing.

FIG. 9 shows contents of job combination management table 128.

As shown, job combination management table 128 provides the columns for a place in a job combination order, a manuscript (job) name, a storage location, a user ID, a password, whether a job is to be deleted (delete column), whether a job is in a wait state (wait column), and whether a job has already been acquired (acquisition column).

The order column indicates a place in a job combination order, while the manuscript name column indicates a manuscript name.

The storage location column indicates the name of a PC 3 on the network combined with a directory name. "None" is entered if no manuscript data set has to be acquired from PC 3, such as if the manuscript data set to be combined was sent to the MFP at step S105 of FIG. 5, or if the manuscript data set is already present at MFP 10.

The user ID column indicates a user ID that is needed if access to the directory is restricted. The password column indicates a password corresponding to the user ID. If access is not restricted, "none" is entered in the user ID and password columns.

The delete column indicates whether a manuscript data set on PC 3, after it has been acquired from PC 3, must be deleted or not.

The wait column indicates whether a manuscript data set is in a wait state, while the acquisition column indicates whether job acquisition unit 104 has stored a manuscript data set on HDD 130 or not.

For a manuscript data set already stored on HDD 130, "no" is entered in the wait column and "already" in the acquisition column. Otherwise, "yes" is entered in the wait column and "not yet" in the acquisition column. For example, if a manuscript data set to be combined was sent to the MFP at step S105 of FIG. 5, or if a manuscript data set is already present at MFP 10, then "no" is entered for the manuscript data set in the wait column.

Returning to FIG. 8, at step S205, CPU 101 checks the wait column in job combination management table 128 to determine whether any manuscript data set is being awaited from PC 3 for acquisition. If there is a manuscript data set with "yes" in the wait column (YES at step S205), CPU 101 acquires the manuscript data set from PC 3 (step S209). Then, CPU 101 once again determines whether any manuscript data set is being awaited from PC 3 for acquisition (step S205).

If the wait column indicates "no" for any entry (NO at step S205), CPU 101 checks the acquisition column in job combination management table 128 to determine whether any manuscript data set is missing from the jobs to be combined (step S206).

If the acquisition column indicates "already" for any entry (NO at step S206), CPU 101 combines all the manuscript data sets based on the order column in job combination management table 128, and sends COMBINATION COMPLETED to PC 3*a* (step S207). CPU 101 then executes the printing of the combined manuscript data (step S208) before ending the process.

If there is any manuscript data set with "not yet" in the acquisition column (YES at step S206), CPU 101 waits for a predetermined period of time based on the time obtained from timing unit 126 (step S210).

After that time period, at step S211, CPU 101 enters "yes" in the wait column for a manuscript data set that has "not yet" in the acquisition column in job combination management table 128 to try once again to acquire the missing manuscript data. Then, it returns to the process of determining whether any manuscript data set is being awaited from PC 3 for acquisition (step S205).

While the present embodiment returns to step S205 after a certain time period if YES at step S206, CPU 101 may inform the user of PC 3*a* about an error after that loop is repeated for a certain number of times (or for a certain time period). Alternatively, CPU 101 may inform the user of the PC that supposedly holds the missing manuscript data to prompt him/her to store the manuscript data.

FIG. 10 is a flow chart that illustrates a subroutine of the job acquisition process executed at step S209 of FIG. 8.

As shown, CPU 101 of MFP 10 reads the entry in the storage location column of job combination management table 128 for one of the manuscript data sets that have "yes" in the wait column in job combination management table 128. Based on that information, CPU 101 accesses an external PC to determine whether the storage location exists (step S221).

If the storage location exists (YES at step S221), CPU 101 searches storage location history table 129 (FIG. 6) to see if the location is identical with the registered location and, if not, updates storage location history table 129. For example, if the storage location is not registered in storage location history table 129, then a new item will be added to storage location history table 129, in which the storage location and information about whether a user ID and password are "required" or "not required" will be entered (step S222).

This is done to update information in storage location history table 129 that manages information about a previous storage location. An entry will be added to, or an entry will be deleted from, storage location history table 129 depending on whether a storage location can be accessed or not.

If the storage location does not exist (NO at step S221), CPU 101 searches storage location history table 129 to see if the storage location is not registered. If it is registered, CPU 101 deletes the item and moves up the following row(s) in the table to fill its space (step S232). Then, at steps S233, CPU 101 informs PC 3*a* of "STORAGE LOCATION NOT EXISTING" as an error, and proceeds to step S230.

When the process at step S222 is completed, at step S223, CPU 101 determines whether the directory contained in the storage location can be accessed using the data in the user ID and password columns in job combination management table 128 (step S223); in other words, the CPU tries to see if it can succeed in user authentication.

If user authentication is successful (YES at step S223), CPU 101 determines whether the manuscript data set (i.e. job) mentioned in the manuscript name column in job combination management table 128 exists (step S224). To achieve this, a file name may be entered in the manuscript name column and then it may be determined if there is a file that has the same file name, or a keyword may be entered in the manuscript name column and then it may be determined if there is a file that has the matching keyword.

If user authentication fails (NO at step S223), CPU 101 informs PC 3*a* of "USER AUTHENTICATION FAILED" as an error (step S231). For a directory that requires no user ID or password, the CPU determines that user authentication was successful (YES) at step S223.

If the manuscript data set exists (YES at step S224), CPU 101 at MFP 10 receives the manuscript data set from PC 3 (step S225). CPU 101 at MFP 10 stores the manuscript data set on HDD 130 (step S226). If it has acquired the manuscript data set, CPU 101 of MFP 10 rewrites the acquisition column in job combination management table 128 for that manuscript data set from "not yet" to "already" (step S227).

On the other hand, if the manuscript data set does not exist in the directory (NO at step S224), CPU 101 rewrites the wait column in job combination management table 128 for that manuscript data set from "yes" to "no" (step S230), and returns to the main routine.

After the process at step S227, at step S228, CPU 101 determines whether the delete column in job combination management table 128 for the acquired manuscript data set indicates "required" or not. If the delete column indicates "required" (YES at step S228), CPU 101 issues a delete request to that PC 3 which holds the manuscript data set (step S229). CPU 101 rewrites the wait column in job combination management table 128 for the acquired manuscript data set from "yes" to "no" (step S230).

If the delete column for the manuscript data set indicates "not required" (NO at step S228), CPU 101 bypasses step S229 to step S230.

(7) Processes by PCs 3*b* and 3*c* for MFP 10

FIG. 11 is a flow chart that illustrates a process of outputting a shared data set (i.e. a job) to MFP 10 executed by PCs 3*b* and 3*c*.

As shown, CPU 20 at PC 3 accepts, from MFP 10, a request for a send instruction of a manuscript data set that includes the storage location (directory) for the manuscript data set. CPU 20 at PC 3 determines whether the specified storage location exists in its own shared data storage unit 31 (step S111).

If the storage location exists (YES at step S111), CPU 20 determines whether the directory included in the storage location is accessible using the user ID and password specified by MFP 10 (step S112).

If the storage location does not exist (NO at step S111), CPU 20 sends a message "STORAGE LOCATION NOT EXISTING" to MFP 10 (step S119), and ends the process.

If user authentication is successful (YES at step S112), CPU 20 determines whether the specified manuscript data set exists (step S113).

If user authentication fails (NO at step S112), CPU 20 sends a message "USER AUTHENTICATION FAILED" to MFP 10 (step S118) and ends the process. If no user ID or password is required, user authentication was successful.

If the manuscript data set exists (YES at step S113), CPU 20 determines whether the operation for the manuscript data set is a delete request from MFP 10 (step S114).

If the specified manuscript data set does not exist (NO at step S113), CPU 20 sends a message "JOB NOT EXISTING" to MFP 10 (step S117) and ends the process.

If a delete request for the manuscript data set is involved (YES at step S114), CPU 20 deletes the manuscript data set (step S115), and ends the process.

If not (NO at step S114), CPU 20 sends the manuscript data set to MFP 10 (step S116), and ends the process.

[First Modification]

During step S209 of FIG. 8, at which MFP 10 acquires manuscript data, CPU 101 may execute the following processes (1) to (3):

(1) Determining whether the manuscript data set to be acquired exists at MFP 10. For example, it is determined (a) whether the manuscript data set to be acquired is already present as a result of a manuscript data set having previously been printed; or (b) whether the manuscript data set to be acquired is already present as a result of a data set having previously been spooled;

(2) If the data set is determined to be present in (1), acquiring it and returning to step S205; and (3) If the data set is determined to be not present in (1), executing the subroutine of FIG. 10.

[Second Modification]

User authentication information (user ID and password) in the composition guideline data of FIG. 7 may be accepted through an input device, such as a keyboard, within input unit 42. This will allow the user to input authentication information easily through a keyboard that comes with a conventional PC.

Alternatively, user authentication information (user ID and password) in the composition guideline data may be input through card reader 46 from a magnetic card C that holds user authentication information. This will allow the user to input authentication information correctly and easily.

User authentication information (user ID and password) in the composition guideline data may also be input through card reader 46 from a contactless IC card C that stores user authentication information. This will enable inputting authentication information correctly and easily from the IC card in a contactless manner. The user is spared the trouble of inserting a card into the card reader.

[Third Modification]

In the above embodiment, an MFP 10 featuring image processing and image forming (printing) functions acquires composition guideline data 50 from PC 3a and, based on it, obtains manuscript data from PCs 3b and 3c. Alternatively, a computer device that works as an image processing device may obtain manuscript data from PCs 3b and 3c based on composition guideline data 50. In this case, the computer device acquires composition guideline data 50 and, based on it, obtains manuscript data sets. The computer device instructs a printing device (another image forming device such as a printer, an MFP and the like) to print the obtained manuscript data sets in an order indicated in composition guideline data 50.

[Fourth Modification]

Composition guideline data 50 only has to include information for specifying a plurality of manuscript data sets and their printing order, and may not have to include any storage location for manuscript data. In such a case, based on information specifying manuscript data sets, MFP 10 searches the computer(s) connected to the network for the manuscript data sets. If the search fails to result in a discovery of the manuscript data sets, MFP 10 informs PC 3a.

[Fifth Modification]

In the above embodiment, composition guideline data 50 is sent from a PC to an MFP via communication. Alternatively, composition guideline data 50 may be input into an MFP manually by a user. Composition guideline data 50 may also be input into an MFP via a storage medium (a memory device, a cell phone, a portable terminal or the like) owned by a user.

[Others]

In the above embodiment, "job combination" encompasses the following notions:

(1) When job A is to be combined with job B, combining the two jobs into one such that the printing of the last page of job A is followed by the initiation of printing of the first page of job B;

(2) When job A is to be combined with job B, combining the two jobs into one such that the last print data set in the last page of job A is followed by the initiation of printing of the first print data set in job B without a page break;

(3) When job A is to be combined with job B, instead of combining the two data sets, providing one series of prints by starting the printing of job B immediately after printing job A; and (4) When job A is to be combined with job B, making one copy out of them by stapling, bookbinding or other post-processing methods. In this case, printing unit 124 of FIG. 3 includes a device for post-processing such as stapling or bookbinding.

For (1) to (3), jobs to be combined are not limited to print jobs (an example of output jobs) and may be other output jobs. For example, they may be send jobs (another example of output jobs) where manuscript data can be sent to an external device via facsimile communication or using the File Transfer Protocol (FTP), for example. For example, for (1), when job A is to be combined with job B, combining the two jobs into one such that the output (for example, sending) of the last page of job A is followed by the initiation of output of the first page of job B; for (2), when job A is to be combined with job B, combining the two jobs into one such that the last data set in the last page of job A is followed by the initiation of output of the first data set in job B without a page break; and for (3), when job A is to be combined with job B, instead of combining the two data sets, outputting one series of data sets by starting the output of job B immediately after outputting job A.

Effects of Embodiments

With the processes described above, according to the present embodiment, an image forming device automatically acquires a manuscript data set (i.e. a job) from a client PC according to a list used for combining jobs (i.e. composition guideline data), instead of waiting for the manuscript data set. Thus, no PCs other than that client PC which sends composition guideline data 50 (PC 3a in the embodiment) have to specify the destination of a job (MFP 10 in the embodiment).

When a user of PC 3a wishes to perform combined job printing, he/she only has to ask a manuscript provider (a user of PC 3b or 3c) to output a manuscript data set (i.e. a job) into a specified box at the PC beforehand. Thus, the user of PC 3a and the manuscript provider do not have to closely communicate the issuance time of the manuscript combination list (i.e. composition guideline data) or information about the destination MFP. As a result, the convenience of the system will be improved.

Even after step S206 in FIG. 8 determines YES, an acquiring process for the job will be repeated after a certain time period. Thus, even after the user of PC 3a issues a manuscript combination list (i.e. composition guideline data), the manuscript provider can output a manuscript data set (i.e. a job) into a specified box at the PC. This will remove time constraints on a user.

If the storage location is not accessible (or the storage location does not exist) at step S221 of FIG. 10, the user of PC 3a is informed thereof (step S233). This will eliminate the situation in which job combination remains undone for a prolonged period of time when the storage location is inaccessible because of a PC power-off.

As shown in FIG. 7, allowing a user ID and password to be set in composition guideline data 50 provides for user authentication. This will avoid access to a box that is only accessible to certain parties.

As shown in FIG. 7, enabling a setting of whether a data set should be deleted or not from composition guideline data 50 makes it possible to delete a manuscript data set from the box after it is acquired. This will prevent a manuscript data set from being held in the box for a prolonged period of time because the person in charge forgot to delete it. This will prevent an overflow of the box of the manuscript provider with data.

As described for step S223 of FIG. 10, the access right to the box is checked before a manuscript data set is acquired and, if the box is not accessible, PC 3a is informed thereof (step S231). This will avoid the situation in which job combination remains undone for a prolonged period of time if the storage location for a manuscript data set is not accessible because of the lack of the access right.

Having MFP 10 store storage location history table 129 and having PC 3a acquire it and display it before creating composition guideline data 50 will eliminate the necessity of the manuscript creator's making an inquiry to the manuscript provider about the storage location for a manuscript.

As described for steps S103 and S105 of FIG. 5, allowing the manuscript creator to send manuscript data to MFP 10 eliminates the manuscript creator's necessity of storing manuscript data in a specified box at his/her PC. Further, sending manuscript data to the MFP will reduce time until job combination.

As described in the first modification, determining whether a job to be acquired is present at MFP 10 and, if so, having the MFP acquire it will reduce time until job combination.

The processes in the above embodiments may be implemented by software or hardware circuitry.

An image processing device may be an MFP, a facsimile device, a copier, a PC, a portable terminal, a cell phone or the like. An image forming device may be an MFP, a facsimile device, a copier or the like. An image forming device forms an image on a sheet using a known electrophotographic method or an ink jet method.

Alternatively, a program for executing the processes of the above embodiments may be provided, or a CD-ROM, a flexible disc, a hard disc, a ROM, a RAM, a memory card or other storage media storing that program may be provided for the user. The processes in the flow charts and description above are executed by a CPU (an example of a computer) according to the program. Further, the program may be transmitted via the Internet or other communication lines and downloaded to a device.

According to the present invention, an image processing device for printing, in a simple way, a plurality of manuscript data sets in a prescribed order based on composition guideline data may be provided.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

What is claimed is:

1. An image processing device comprising:
    a first acquiring unit for acquiring composition guideline data containing information specifying a plurality of manuscript data sets formed by a plurality of users which are different from each other, and specifying an output order of the plurality of manuscript data sets;
    a second acquiring unit for accessing a first external device among a plurality of external devices based on the composition guideline data to acquire at least one of the plurality of manuscript data sets from a shared data storage unit of each user of the first external device via communication; and
    an output instruction unit for issuing an output instruction for outputting, in an order indicated by the composition guideline data, the plurality of manuscript data sets specified by the composition guideline data, including the at least one manuscript data set acquired by the second acquiring unit, wherein
    the composition guideline data further contains user authentication information for accessing the shared data storage unit of each user, the user authentication information being specified for each of the plurality of manuscript data sets, and the second acquiring unit acquires the manuscript data sets from the shared data storage unit corresponding to the information specifying the manuscript data cct sets of the composition guideline data.

2. The image processing device according to claim 1, wherein, if the second acquiring unit fails to acquire the at least one manuscript data set from the first external device, the second acquiring unit accesses the first external device once again after a predetermined period of time.

3. The image processing device according to claim 1, further comprising a storage location recording unit for recording information for managing a storage location for the manuscript data sets; and
    an update unit for updating information recorded by the storage location recording unit based on a result of access by the second acquiring unit.

4. The image processing device according to claim 1, wherein the second acquiring unit includes a deleting unit for deleting the at least one manuscript data set from the first external device after the at least one manuscript data set is acquired.

5. The image processing device according to claim 1, further comprising a storage unit for storing at least one of the manuscript data sets,
wherein, if one of the manuscript data sets to be acquired from the first external device according to the composition guideline data is stored on the storage unit, the second acquiring unit acquires, from the storage unit, the one of the manuscript data sets.

6. The image processing device according to claim 5, wherein the second acquiring unit acquires, from the first external device, a manuscript data set not stored on the storage unit.

7. The image processing device according to claim 1, wherein the at least one manuscript data set acquired by the second acquiring unit is a print data set.

8. The image processing device according to claim 1, wherein the first acquiring unit acquires the composition guideline data from a second external device that is different from the first external device.

9. The image processing device according to claim 8, wherein, when the storage location for the manuscript data set indicated by the composition guideline data does not exist at the first external device, the second acquiring unit informs the second external device thereof.

10. The image processing device according to claim 8, wherein the second external device includes an input unit through which user authentication information is inputted, and
the second acquiring unit accesses the first external device based on the user authentication information.

11. The image processing device according to claim 8, wherein, when the first external device fails in user authentication, the second acquiring unit informs the second external device thereof.

12. The image processing device according to claim 8, wherein the second external device further includes:
a third acquiring unit for acquiring information indicating a storage location for the at least one manuscript data set; and
a display unit for displaying information acquired by the third acquiring unit.

13. The image processing device according to claim 8, wherein the second acquiring unit receives and thereby acquires, via communication from the second external device, at least one of the plurality of manuscript data sets specified by the composition guideline data other than the at least one manuscript data set acquired by accessing the first external device.

14. The image processing device according to claim 1, further comprising a printing unit for printing the plurality of manuscript data sets specified by the output instruction unit for output.

15. A method of controlling an image processing device comprising:
a first acquiring step acquiring composition guideline data containing information specifying a plurality of manuscript data sets formed by a plurality of users which are different from each other, and specifying an output order of the plurality of manuscript data sets;
a second acquiring step accessing an external device among a plurality of external devices based on the composition guideline data to acquire at least one of the plurality of manuscript data sets from a shared data storage unit of each user of the external device via communication; and
an output instruction step issuing an output instruction for outputting, in an order indicated by the composition guideline data, the plurality of manuscript data sets specified by the composition guideline data, including the at least one manuscript data set acquired at the second acquiring step, wherein
the composition guideline data further contains user authentication information for accessing the shared data storage unit of each user, the user authentication information being specified for each of the plurality of manuscript data sets, and in the second acquiring step, the manuscript data sets are acquired from the shared data storage unit corresponding to the information specifying the manuscript data sets of the composition guideline data.

16. A non-transitory computer readable medium storing a control program for an image processing device, the control program causing a computer to execute processing comprising the steps of:
a first acquiring step acquiring composition guideline data containing information specifying a plurality of manuscript data sets formed by a plurality of users which are different from each other, and specifying an output order of the plurality of manuscript data sets;
a second acquiring step accessing an external device among a plurality of external devices based on the composition guideline data to acquire at least one of the plurality of manuscript data sets from a shared data storage unit of each user of the external device via communication; and
an output instruction step issuing an output instruction for outputting, in an order indicated by the composition guideline data, the plurality of manuscript data sets specified by the composition guideline data, including the at least one manuscript data set acquired at the second acquiring step, wherein
the composition guideline data further contains user authentication information for accessing the shared data storage unit of each user, the user authentication information being specified for each of the plurality of manuscript data sets, and in the second acquiring step, the manuscript data sets are acquired from the shared data storage unit corresponding to the information specifying the manuscript data sets of the composition guideline data.

* * * * *